United States Patent Office 3,400,698
Patented Sept. 10, 1968

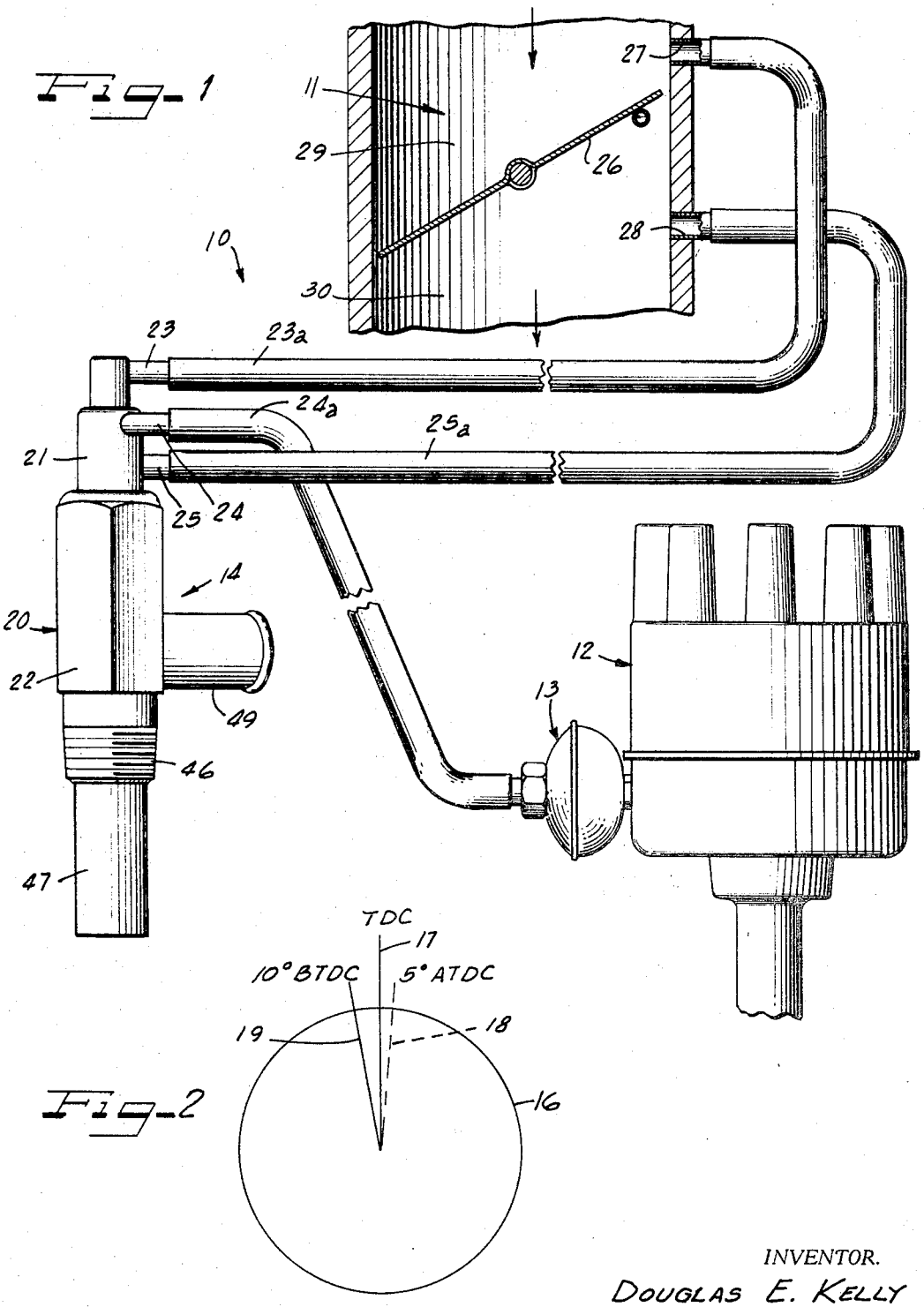

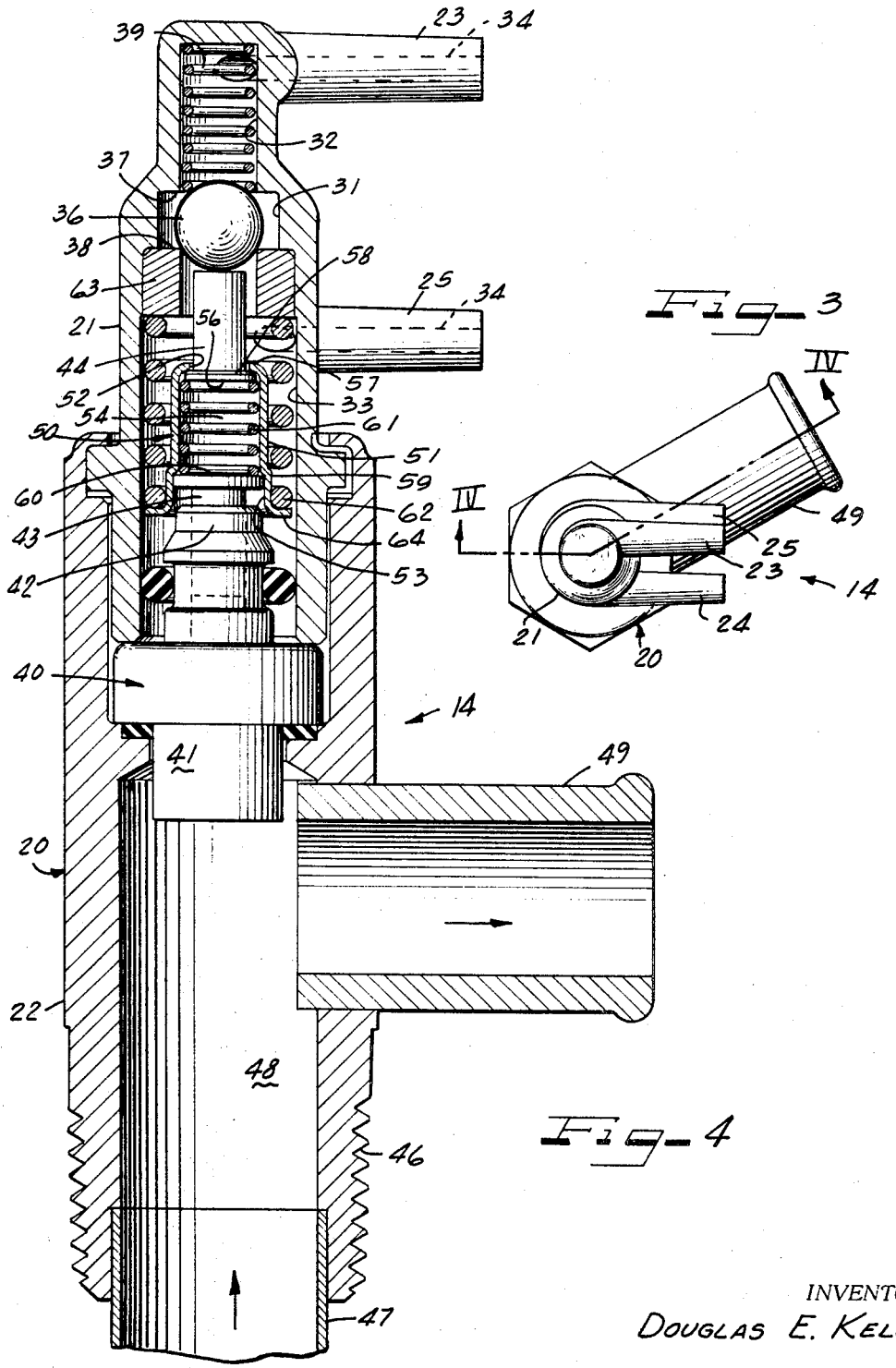

3,400,698
VACUUM PORTED SWITCH
Douglas E. Kelly, Northfield, Ill., assignor to The Dole Valve Company, Morton Grove, Ill., a corporation of Illinois
Filed Dec. 22, 1966, Ser. No. 603,995
19 Claims. (Cl. 123—117)

ABSTRACT OF THE DISCLOSURE

A switch for communicating a vacuum operated spark advance mechanism of a distributor of an internal combustion engine with the air intake passageway of the carburetor either upstream or downstream of the butterfly valve thereof depending upon the operating temperature of the engine for retarding the spark at idle when the engine is running cool and for advancing the spark when the engine is running hot.

Background of the invention

The amount of noxious fumes being discharged into the atmosphere from the engines of automobiles and other vehicles due primarily to incomplete combustion is becoming so great as to present problems in health due to air pollution. In some areas of the country this problem is particularly pronounced.

Investigations have been conducted to determine various ways to reduce this health hazard. With respect to operation of internal combustion engines, it has been determined that when an engine operates at "idle" the proportion of noxious gases exhausted to the atmosphere is quite high when ignition is advanced to fire at about 10° before the top dead center positions of the pistons. On the other hand, an engine runs relatively "clean" at idle, i.e., with a markedly reduced proportion of noxious gases as a result of more complete combustion of fuel within the cylinders, when ignition is retarded to fire at about 5° after top dead center of the pistons.

In view of the foregoing, one apparently simple manner of reducing air pollution lies in operating automobile engines at idle with a retarded spark. Such mode of operation, however, gives rise to another serious problem inherent in the operating characteristics of an internal combustion engine. Retardation of the spark causes the operating temperature of the engine to rise and continued operation with a retarded spark causes the temperature to rise to prohibitive levels. By contrast, an advance of the spark, while resulting in less complete combustion and an attendant increase in noxious gases being exhausted from the engine, has the salutary effect of reducing the operating temperature of the engine.

Summary of the invention

The present invention contemplates the provision of means for automatically retarding the spark so long as the operating temperature of the engine remains below a predetermined maximum level. However, once this maximum level is reached the spark is automatically advanced and remains advanced until the engine has cooled to a predetermined level, whereupon the spark is again automatically retarded. Thus the engine runs "clean" the greatest proportion of time commensurate with safe operation of the engine.

This invention is particularly suited for use in an engine utilizing a vacuum operated spark advance on the distributor, and features a switch which communicates the spark advance mechanism with the carburetor air intake passageway on either the upstream or downstream side of the butterfly valve, depending upon whether the engine is running "hot" or "cool." The different vacuum conditions on the opposite sides of the butterfly valve are effective to operate the spark advance mechanism.

When the engine is running "cool" means responsive to the operating temperature of the engine automatically communicates the spark advance mechanism with ported vacuum. That is, with the carburetor air intake passageway on the upstream side of the butterfly valve. At idle the vacuum on this side of the butterfly valve is about 0″ Hg and the spark advance mechanism maintains the spark in a retarded position. When the temperature of the engine increases to the maximum predetermined level, however, the temperature responsive means communicates the spark advance mechanism with manifold vacuum, that is, with the carburetor intake passageway on the downstream side of the butterfly valve. At idle the vacuum on this side of the butterfly valve is about 16″ Hg and the spark advance mechanism adjusts to advance the spark.

When the engine is operated at speeds greater than idle the difference in vacuum across the butterfly valve becomes less and, accordingly, a difference in the operating temperature of the engine will have less effect on the timing of the spark. However, at greater engine speeds the problem of incomplete combustion is generally less serious. Thus, at idle, when the problem of incomplete combustion and the discharge of noxious fumes is greatest, the present invention is most effective in controlling the timing of the spark to attain cleaner operation.

It is, therefore, an object of the present invention to reduce air pollution by reducing the amount of noxious gases being discharged to the atmosphere from internal combustion engines.

Another object of the invention is to provide means for varying the timing of the spark of an internal combustion engine as a function of the operating temperature of the engine.

Another object of the invention is to provide means for communicating the vacuum operated spark advance mechanism of a distributor with the air intake passageway of the carburetor on either the upstream or the downstream side of the butterfly valve depending upon the operating temperature of the engine.

Another object of the invention is to provide a temperature responsive switch for changing between the upstream and downstream sides of the butterfly valve which is simple in construction, inexpensive in manufacture, reliable in operation and capable of serving a long, useful life.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Brief description of the drawings

FIGURE 1 is a fragmentary and partially schematic view of the fuel supply and ignition system of an internal combustion engine constructed in accordance with the principles of the present invention and including a distributor leaving a vacuum operated spark advance mechanism and a switch for controlling the vacuum to the spark advance mechanism.

FIGURE 2 is a graphical representation of the differences in timing of the spark as a result of the operation of the vacuum operated spark advance mechanism of the distributor shown in FIGURE 1;

FIGURE 3 is a top plan view of the switch shown in FIGURE 1 which communicates the spark advance mechanism of the distributor with the air intake passageway of the carburetor; and FIGURE 4 is an enlarged vertical cross-sectional view taken along lines IV—IV of FIGURE 3 with parts shown in elevation.

Description of the preferred embodiment

In FIGURE 1 a fuel supply and ignition system for an internal combustion engine constructed in accordance with the principles of the present invention is indicated generally at reference numeral 10. The system 10 comprises a carburetor having an air intake passageway 11, a distributor 12 having a vacuum operated spark advance mechanism 13 and a ported vacuum switch assembly 14 connecting the spark advance mechanism 13 with the air intake passageway 11 in fluid communication.

As will be understood by those skilled in the art, the air intake passageway 11 directs air from the atmosphere to a chamber for mixing the fuel such as gasoline from whence the admixture of combustible air and fuel is directed through an intake manifold to the various cylinders of the engine. The distributor 12 directs current to the various spark plugs or the like ignitors of the engine in timed relation.

The spark advance mechanism 13 regulates the time of firing of the spark plugs with respect to the positions of the respective pistons during the compression and power strokes of the pistons.

In the graphical representation of FIGURE 2 a circular line 16 represents the displacement of a piston during the compression and power strokes of a four cycle engine or during both strokes of a two cycle engine. The point on the circle 16 intersected by a line 17 indicates the top dead center position of the piston, that is, the position of the piston after it has completed its compression stroke and is about to begin the power stroke and occurs at the end of the upward throw of a piston in its cylinder. Line 18 intersects the circle 16 at a point which represents the position of the piston at about 5° after top dead center during the power stroke, and the circle 16 intersects a line 19 at a point which represents the position of the piston at about 10° before top dead center during the compression stroke of the piston.

The spark advance mechanism 13 is adapted to control the timing of the firing of the spark plugs in the respective cylinders within a range of between about 10° before top dead center and about 5° after top dead center. The spark advance mechanism 13 is vacuum operated, and when subjected to a high vacuum condition advances the ignition timing to about 10° before top dead center (referred to as "advancing of the spark") and when subjected to a low vacuum condition retards the ignition timing to about 5° after top dead center (referred to as "retarding of the spark").

As noted, retarding the spark at idle results in more complete combustion and a reduction in noxious gases exhausted from the engine but also results in an increase in the operating temperature of the engine. By contrast, advancing the spark results in a more "dirty" operation of the engine from the standpoint of the amount of noxious gases being discharged to the atmosphere, but additionally results in a reduced operating temperature of the engine.

The ported vacuum switch assembly 14 operates to subject the spark advance mechanism 13 to a low vacuum condition to retard the spark as long as the engine is running cool. When the engine begins to run hot, however, the switch 14 operates to connect the spark advance mechanism to a high vacuum condition to advance the spark. After engine temperature has dropped to a satisfactory level the switch 14 again communicates the spark advance mechanism 13 with a low vacuum condition.

The switch assembly 14 comprises a switch housing 20 which includes an upper tubular portion 21 and a lower tubular portion 22. Projecting radially from the upper tubular portion 21 are three conduit or the like connectors 23, 24 and 25 connected respectively to conduits 23a, 24a and 25a.

An opposite end of conduit 23a is connected in fluid communication to the carburetor air intake passageway 11 on the upstream side of a butterfly valve 26 through a port indicated at reference numeral 27, and the other end of conduit 25a communicates with the air intake passageway 11 on the downstream side of the butterfly valve 26 through a port indicated at 28. The other end of conduit 24a is connected to the vacuum operated spark advance mechanism 13.

When the engine runs at idle speed the butterfly valve 26 is substantially closed and the pressure of the air in the intake passageway 11 on the upstream side of the butterfly valve 26 is at or near atmospheric. The air on the downstream side of the butterfly valve 26, however, is at a vacuum condition generally in the order of about 16 or 17″ Hg.

The butterfly valve 26 opens as engine speed increases and thus the difference in the vacuum condition of the air on the upstream and downstream sides of the butterfly valve 26 decreases as engine speed increases.

The air intake passageway 11 on the upstream side of the butterfly valve 26 is indicated at reference numeral 29 and is referred to hereinafter as the ported or carburetor chamber, and the downstream side of the butterfly valve 26 is indicated at 30 and referred to hereinafter as the manifold chamber.

Referring to FIGURE 4, the upper portion 21 of the housing 20 is substantially hollow and the interior thereof is constructed to provide a middle chamber 31 and a pair of end chambers 32 and 33 situated on opposite sides of the chamber 31. The chambers 31–33 are cylindrically shaped and concentrically aligned with each other. The hose or conduit connectors 23–25 are suitably apertured as at 34 to provide fluid communication between their respective conduits and chambers 32, 31 and 33, respectively.

In order to vary the vacuum to spark advance mechanism 13 through conduit 24a means are provided to alternatively communicate chamber 31 with chambers 32 and 33. Accordingly, a spherical valve member 36 is situated within chamber 31 and is movable between a pair of ports 37 and 38 situated at opposite ends thereof. When the valve member 36 assumes the position shown in FIGURE 4 to close the port 38, chamber 31 is in communication with chamber 32. However, when the valve member 36 moves upwardly to close port 37, chamber 31 is in communication with chamber 33.

The valve member 36 is constantly biased toward port 38 by means of a coil spring 39 housed in chamber 32. The valve member 36 is urged in an opposite direction in opposition to the bias of the spring 39 by means of a temperature responsive power element indicated generally at reference numeral 40.

As it will be understood by those skilled in the art, the power element 40 comprises a hollow body portion 41 filled with a wax or similar substance which expands upon it being heated and contracts upon being cooled. Projecting from one end 42 is a piston or plunger 43 which moves outwardly from the end 42 when the power element 40 is heated and retracts into the end 42 when the power element is cooled.

The valve member 36 is not engaged directly by the plunger 43 but instead by a cylindrically shaped drive stud 44 which resides in chamber 33 along with the power element 40.

It is contemplated that the power element 40 be so situated as to be affected by and responsive to variations in the operating temperature of the engine. Thus in the illustrated embodiment the end of the lower tubular portion 22 of the housing 20 is threaded as at 46 to be turned into a suitable engine temperature affected threaded, mounting on the engine. In water cooled engines a pipe 47 may be connected in the coolant circulation system to circulate a portion of the cooling liquid through a chamber 48 into which the lower end of the power element extends and out a nozzle 49 to be returned to the coolant system. In air cooled engines, of course, the housing 20 may be mounted any place on the engine that accurately reflects changes in the operating temperature of the engine.

In order to prevent damage due to overheating of the thermostatic power element 40, an overtravel mechanism 50 is interposed between the plunger 43 and the drive stud 44. The mechanism 50 comprises a bell shaped housing 51 having open ends 52 and 53 and forming a chamber 54 therewithin. A lower end 56 of the drive stud 44 projects into the chamber 54 through one end 52 and the top end 42 of the power element 40 projects into the chamber 54 through the other end 53.

The upper end of the bell housing 51 is inturned as at 57 to form a lip which extends over an enlarged diameter radial shoulder 58 formed at the lower end 56 of the drive stud 44. An outwardly flared portion 59 of the housing 51 extends partially over an enlarged shoulder 60 formed at the distal end of the plunger 43.

Disposed in the interior 54 of the housing 51 is a spring 61 which bottoms at its lower end on the shoulder 60 of the plunger 43 and at its upper end on the bottom wall 56 of the drive stud 44. The spring 61 constantly biases the drive stud 44 away from the plunger 43 and toward the spherical valve member 36. The drive stud 44 is partially retained within the bell housing 51, however, due to the abutment of the inturned lip 57 with the shoulder 58 of the drive stud.

Another coil spring 62 surrounds the bell housing 51 and bottoms at an upper end thereof on an annular insert 63 mounted within the chamber 33 and at the lower end thereof on an outturned flange 64 at the bottom of the bell housing 51.

The relative disposition of the parts of the switch assembly 14 shown in FIGURE 4 obtains when the operating temperature of the engine is relatively low. Thus the plunger 43 of the thermostatic power element 40 is retracted.

Further, the spherical valve member 36 is biased downwardly by the spring 39 to close port 38 and chambers 31 and 32 are in communication with one another. Thus the vacuum condition to which the spark advance mechanism 13 is subjected is that which obtains in the carburetor chamber 29 of the air intake passageway 11. As a result the timing of the ignition system is retarded, combustion is substantially complete and the discharge gases are "clean." Retardation of the spark, however, tends to cause the operating temperature of the engine to increase.

If conditions are such that engine temperature does increase at idle with a regarded spark the plunger 43 of the temperature responsive power element 40 will begin to move outwardly. This, in turn, will cause the bell housing 51 of the overtravel mechanism 50 to move upwardly against the bias of the spring 62. The drive stud 44 also moves upwardly as a result of the bias of the inner spring 61 to urge the spherical valve member 36 into closing engagement with the port 37, thus communicating chamber 31 with chamber 33. The spark advance mechanism 13 is then subjected to a high vacuum condition and the spark is advanced to cool the engine. With the advanced spark, combustion is less complete and the exhaust gases discharged by the engine are "dirty."

In the event that the temperature of the engine were to continue to increase, the plunger 43 and the bell housing 51 would continue to move upwardly, thus compressing the spring 61 to accommodate overtravel of the plunger 43. Thus in such circumstances, damage to the moving parts of the switch assembly 14 are avoided.

Upon a reduction in the operating temperature of the engine the plunger 43 will retract due to the bias of the spring 62 acting thereon and the drive stud 44 will move away from the valve member 36. The spring 39 will then again effect downward movement of the valve member 36 to close the port 38 to again communicate the low vacuum carburetor chamber 29 of the air intake passageway 11 with the spark advance mechanism 13.

As a result of this invention the timing of the spark is automatically retarded at idle until engine temperature requires advancing of the spark. After the spark has been advanced and the engine has cooled sufficiently, the spark is again automatically retarded.

Although minor modifications might be suggested by those versed in the art, it should be understood that I wish to embody within the scope of the patent warranted hereon all such modifications as reasonably come within the scope of my contribution to the art.

I claim as my invention:

1. In an internal combustion engine ignition and carburetion system having a carburetor including an air intake passageway and a butterfly valve partitioning the passageway into a carburetor chamber upstream of the valve and a manifold chamber downstream of the valve, and a distributor including a vacuum operated spark advance mechanism, the improvement of a switch assembly for connecting the spark advance mechanism to the carburetor chamber or the manifold chamber depending upon the operating temperature of the engine comprising:
   a housing having a first chamber for communication with said spark advance mechanism, a second chamber for communication with said carburetor chamber and a third chamber for communication with said manifold chamber,
   means interconnecting said first, said second and said third chambers in fluid communication,
   a valve member movable between a first position to isolate said third chamber from said first and said second chambers and a second position to isolate said second chamber from said first and said third chambers, and
   means responsive to the operating temperature of the engine for moving said valve member between said first and second positions.

2. The apparatus as defined in claim 1 including means for constantly biasing said valve member to one of said positions.

3. The apparatus as defined in claim 1 wherein said last named means comprises a thermostatic power element having an extensible plunger for moving said valve member to one of said positions.

4. The apparatus as defined in claim 3 including means for constantly biasing said valve member to the other of said positions.

5. The apparatus as defined in claim 3 including a resilient member interposed between said valve member and said plunger to accommodate overtravel of said plunger.

6. The apparatus as defined in claim 1 wherein said first chamber is interposed between said second and said third chambers and said valve member resides in said first chamber.

7. For use in an internal combustion engine having a carburetor including an air intake passageway and a butterfly valve partitioning the passageway into a carburetor chamber and a manifold chamber, and a distributor including a vacuum operated spark advance mechanism, a ported vacuum switch assembly for operatively connecting the spark advance mechanism alternatively to the carburetor chamber or the manifold chamber depending upon the operating temperature of the engine comprising,
   a housing having a first chamber, a second chamber and a third chamber,
   means in said housing for communicating said first, second and third chambers respectively to the spark advance mechanism, the carburetor chamber and the manifold chamber,
   first and second port means communicating respectively said first and said second chambers and said first and said third chambers,
   valve means movable between said first and said second port means, and means responsive to the operating temperature of the engine for moving said valve means between said first and said second port means.

8. The vacuum ported switch assembly as defined in claim 7 wherein said first, said second and said third chambers are in mutually aligned relation with said first chamber being between said second and said third chambers, whereby said first chamber is a middle chamber and said second and said third chambers are end chambers.

9. The vacuum ported switch assembly as defined in claim 7 wherein said valve means is situated in said first chamber.

10. The vacuum ported switch assembly as defined in claim 8 and including biasing means in one of said end chambers constantly biasing said valve member toward the other of said end chambers.

11. The vacuum ported switch assembly as defined in claim 10 wherein said temperature responsive means comprises a thermostatic power element having an extensible plunger for moving said valve member toward said one of said end chambers.

12. The vacuum ported switch assembly as defined in claim 11 wherein said plunger is aligned coaxially with said first, second and third chambers.

13. A vacuum ported switch assembly for controlling, as a function of engine operating temperature, the timing of the spark in an internal combustion engine having a carburetor and distributor including a vacuum operated spark advance mechanism comprising,
   a switch housing having means forming a first, a second and a third chamber therein,
   means for communicating said first chamber with the vacuum operated spark advance mechanism of the distributor, said second chamber with the air intake passageway of the carburetor upstream of the butterfly valve therein and said third chamber with the air intake passageway downstream of the butterfly valve,
   a valve member in said housing movable to a first position for communicating said first chamber with said second chamber and to a second position for communicating said first chamber with said third chamber, and
   means responsive to the operating temperature of said engine for moving said valve member between said first and second positions.

14. The switch assembly as defined in claim 13 for use in a water cooled engine and including means for directing circulating engine coolant across said temperature responsive means.

15. The switch assembly as defined in claim 13 wherein said chambers are arranged in mutually aligned relation and said second and third chambers are situated at opposite ends of said first chamber.

16. The switch assembly as defined in claim 15 and including a first port communicating said first chamber with said second chamber and a second port communicating said first chamber with said third chamber and wherein said valve member resides within said first chamber and is movable between said first and second ports.

17. The switch assembly as defined in claim 16 wherein said temperature responsive means comprises biasing means in one of said end chambers constantly biasing said valve member toward one of said ports and a thermostatic power element having an extensible plunger extending through the other of said end chambers for moving said valve member toward the other of said ports.

18. The switch assembly as defined in claim 13 wherein said temperature responsive means comprises a thermostatic power element having a plunger reciprocally movable in opposite directions toward and away from said valve member, a drive stud operatively engageable with said valve member for pushing said valve member in one of said opposite directions and an overtravel spring interposed between said plunger and said drive stud.

19. The switch assembly as defined in claim 18 and including,
   means forming shoulders on said plunger and said stud both facing toward said valve member,
   a bell housing comprising a tubular body portion having a pair of open ends,
      said overtravel spring and said shoulder of said stud being situated within said body portion with said stud extending out of one end of said body portion,
      said body portion having an inturned flange at said one end thereof bending over the shoulder of said stud and an outwardly flared portion abutting said shoulder of said plunger, and
   a coil spring in said switch housing constantly biasing said flared portion of said bell housing against said shoulder of said plunger.

References Cited

UNITED STATES PATENTS

| | | |
|---|---|---|
| 2,809,620 | 10/1957 | Boylan. |
| 3,301,242 | 1/1967 | Candelise. |
| 3,329,136 | 7/1967 | Cadiou. |
| 3,356,083 | 12/1967 | Clark. |

RALPH D. BLAKESLEE, *Primary Examiner.*